United States Patent
Kakar et al.

(10) Patent No.: US 12,454,759 B2
(45) Date of Patent: Oct. 28, 2025

(54) METHOD OF COATING ALLOY WHEELS USING INTER-COAT PLASMA

(71) Applicant: Superior Industries International, Inc., Southfield, MI (US)

(72) Inventors: Parveen Kakar, Novi, MI (US); Henry Clay Chenault, III, Fayetteville, AR (US)

(73) Assignee: Superior Industries International, Inc., Southfield, MI (US)

( * ) Notice: Subject to any disclaimer, the term of this patent is extended or adjusted under 35 U.S.C. 154(b) by 933 days.

(21) Appl. No.: 16/256,550

(22) Filed: Jan. 24, 2019

(65) Prior Publication Data

US 2019/0233945 A1    Aug. 1, 2019

Related U.S. Application Data

(63) Continuation-in-part of application No. 15/524,075, filed as application No. PCT/US2015/059954 on Nov. 10, 2015.

(Continued)

(51) Int. Cl.
  *C23C 22/78* (2006.01)
  *B05D 1/00* (2006.01)
  (Continued)

(52) U.S. Cl.
  CPC ............... *C23C 22/78* (2013.01); *B05D 1/62* (2013.01); *B05D 3/142* (2013.01); *B05D 3/145* (2013.01);
  (Continued)

(58) Field of Classification Search
  CPC ..... C23C 22/78; C23C 22/73; C23C 2222/20; B05D 1/62; B05D 7/14; B05D 3/145; B05D 3/142; B05D 7/52; B05D 7/53
  See application file for complete search history.

(56) References Cited

U.S. PATENT DOCUMENTS

| 4,866,241 A | 9/1989 | Doherty et al. |
| 2005/0120557 A1* | 6/2005 | Gatton .................. B23B 27/145 |
| | | 29/894.32 |

(Continued)

FOREIGN PATENT DOCUMENTS

| DE | 102009042103 A1 | 3/2011 |
| WO | 2004076716 A1 | 9/2004 |

(Continued)

OTHER PUBLICATIONS

Mannouch, Steve, "Spray Gun Technique." ITW DeVilbiss Ind. Training Center (Oct. 1995), Issue 2.

(Continued)

*Primary Examiner* — Adil A. Siddiqui
(74) *Attorney, Agent, or Firm* — Bodman, PLC

(57) ABSTRACT

An alloy wheel is formed having a three dimensional configuration defining a face and recessed surfaces. The face of the wheel is machined providing a smooth surface at the face and defining an edge between the smooth surface of the face and the recessed surfaces. A nozzle element for projecting a plasma jet toward the wheel is provided. The plasma jet is projected toward the smooth surface of the face, the edge, and toward at least a portion of the recessed surfaces forming an alloy oxide at least on the face and the edge disposed between the face and the recessed surfaces. A first polymeric coating is applied over the face, the recessed surfaces and the edge disposed between the face and the recessed surfaces.

12 Claims, 4 Drawing Sheets

Related U.S. Application Data

(60) Provisional application No. 62/077,447, filed on Nov. 10, 2014.

(51) Int. Cl.
  B05D 3/14 (2006.01)
  B05D 7/00 (2006.01)
  B05D 7/14 (2006.01)
  C23C 22/73 (2006.01)

(52) U.S. Cl.
  CPC ............. B05D 7/14 (2013.01); B05D 7/52 (2013.01); C23C 22/73 (2013.01); B05D 7/53 (2013.01); C23C 2222/20 (2013.01)

(56) References Cited

U.S. PATENT DOCUMENTS

| | | |
|---|---|---|
| 2005/0282003 A1 | 12/2005 | Mayzel et al. |
| 2006/0000094 A1 | 1/2006 | Garesche et al. |
| 2007/0207310 A1 | 9/2007 | Storey |
| 2010/0209618 A1* | 8/2010 | Kuhlenschmidt ........ B05D 3/12 427/535 |
| 2012/0015209 A1 | 1/2012 | Straccia et al. |
| 2013/0212046 A1* | 8/2013 | Henshue ............... E01C 11/222 705/500 |
| 2014/0113146 A1* | 4/2014 | Haack ............... C23C 16/45595 428/425.5 |
| 2017/0320080 A1 | 11/2017 | Kakar et al. |

FOREIGN PATENT DOCUMENTS

| | | |
|---|---|---|
| WO | 2014118211 A1 | 8/2014 |
| WO | 2016077345 A1 | 5/2016 |

OTHER PUBLICATIONS

"How to Powder Coat." http://web.archive.org/web/20130830034400'http://www.wikihow.com/Powder-Coat.
International Search Report and Written Opinion of International Application No. PCT/US2015/059954 dated Mar. 3, 2016.
Chinese Notification of Second Office Action & Search Report of Chinese Application No. 201580067198.8 dated Oct. 28, 2019.

* cited by examiner

METHOD OF COATING ALLOY WHEELS USING INTER-COAT PLASMA

PRIOR APPLICATIONS

This application is a Continuation-In-Part Application, which claims priority to U.S. patent application Ser. No. 15/524,075, which is a National Stage of International Patent Application No. PCT/US2015/059954, filed on Nov. 10, 2015, which claims priority to U.S. Provisional Patent Application No. 62/077,447 filed Nov. 10, 2014, the contents of each of which are incorporated herein by reference.

TECHNICAL FIELD

The present application relates generally toward a method of coating a cast alloy wheel for providing improved durability. More specifically, the present application relates toward a method of treating a cast alloy wheel with plasma as part of a coating process for providing improved durability.

BACKGROUND

Improving durability of exterior automotive components is an ongoing endeavor. In particular, chipping or other abrasion of an exterior coating of a metallic substrate is known to cause accelerated failure of the coating from oxidation, which is manifested as white rust on aluminum alloy components. This is particularly true for aluminum wheels, which require a significant amount of processing to provide an aesthetically pleasing surface that is also resistant to chipping and rust. To date, none of the treatments performed on cast alloy wheels has been able to provide the enhanced durability requested by the OEM customer.

The three-dimensional configuration of a typical cast alloy wheel adds to the complexity of the coating process. The present process includes a number of steps beginning with forming the alloy wheel to achieve the three-dimensional configuration. Subsequent to forming, the alloy wheel is machined to provide a smooth surface having a desired configuration. After machining, the entire wheel is subject to a pre-treatment including liquid cleaning and the addition of a liquid conversion coating to provide corrosion resistance and improved paint adhesion. Subsequent to treatment with the conversion coating, the wheel is painted with a powder primer and liquid color coat after which, the face of the wheel is sometimes again machined to expose a bright machined surface to achieve a desired aesthetic affect. The machined portion of the wheel is once again treated with a liquid conversion coating and painted with a powder or liquid clear coat to provide a two-toned appearance where the face of the wheel exhibits a bright machined surface and the remainder of the three-dimensional contours of the wheel exhibits the color coating.

This process is not only exceedingly laborious, the durability of the clear coat coating, particularly on the face of the wheel, has not kept pace with increasing consumer expectations. The cost associated with maintaining and operating application equipment for applying the conversion coating is becoming increasing cost prohibitive while not providing requisite durability. In addition, environmental concerns are associated with the chemicals used to apply the conversion coatings to the wheel surface, which involves a significant amount of water that later becomes contaminated waste. Therefore, it would be desirable to enhance the durability of the coated surfaces of an alloy wheel while simultaneously reducing the number of steps required to provide a durable coating.

SUMMARY

A method of coating an alloy object includes providing a plasma assembly for exposing an object ionized plasma. An energy state of the surface of the object is increased by the ionized plasma activating the surface of the object. A silicon based compound is injected into the ionized plasma for coating the surface of the object with silicon compound while the surface of the object is disposed at a raised energy state. The raised energy state of surface of the object is lowered toward a ground state for allowing the silicon based compound to react with the surface onto which it is applied forming a new crosslinked compound. The energy state of the surface of the object is again raised by exposure to the ionized plasma after the silicon compound has crosslinked. A first polymeric coating is subsequently applied to the surface over the silicon compound.

In addition to exposing the surface of the wheel to plasma by way of jet or other conventional exposure, plasma is optionally emitted onto a first polymeric coating prior to applying a second polymeric coating to raise the energy state of the first polymeric coating prior to applying the second polymeric coating. Subjecting the first polymeric coating to the plasma treatment has proven to enhance adhesion between coating layers. It is believed that the increased energy state of the first coating improves bonding and intra coat adhesion between the first and the second polymeric coating. When used in combination with exposing the plasma to the object alloy, multi-layer coating adhesion and durability improvements are achievable.

It has also been discovered that the natural process of crosslinking of the silicon based conversion coating lowers the energy state of the conversion coating. Crosslinking of the conversion coating is desirable for improved durability. It has also been discovered that raising the energy state of the conversion coating after crosslinking facilitates bonding of the polymer coating to the silicon based conversion coating further improving durability performance. The inventive method of the present application has provided enhanced durability qualities that weren't previously achievable of the prior art coating process all while reducing the use of hazardous chemicals in creating conventional conversion coating. Prior to the performance testing done on a wheel subjected to the process of the present application, it was believed that treating an alloy surface with a conventional conversion coating provided the best possible durability when the wheel surface is painted with a polymeric coating.

The improvements after accelerated testing exceeded all expectations by providing unexpected durability results. After filiform testing in a humidity chamber nearly no corrosion extended from a line scribed into the alloy substrate as per ASTM test procedures. Alternatively, a conventional wheel coating system making use of a conventional conversion coating showed in excess of 3 mm of corrosion.

A gravelometer test was performed per ASTM D3170 standards on a wheel coated by the method of the present invention and a wheel coated by the conventional method. Although the coating was marred, the wheel coated using the method of the present invention showed no chipping of the coating layers after being subjected to the gravelometer test and having an ASTM rating of A, or the highest rating indicating improved adhesion. The wheel having the conventional coating showed a significant number of coating chips in the range of 3-6 mm.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION

Figure 1:
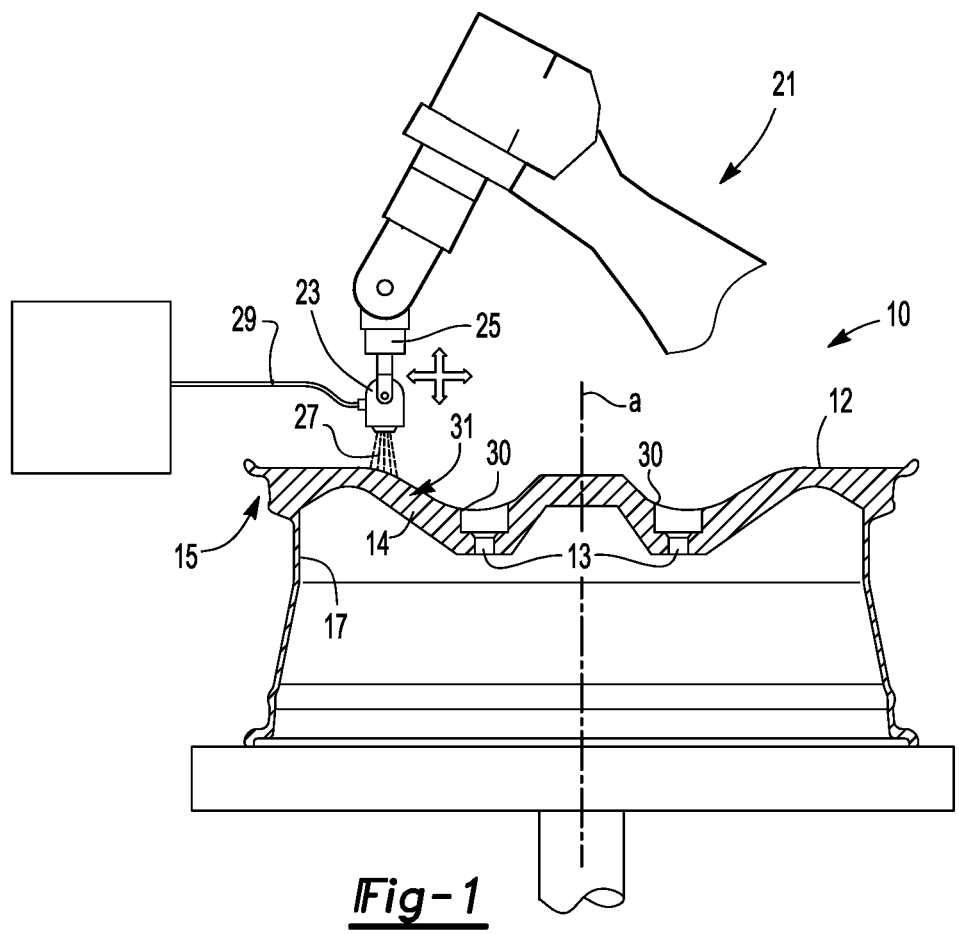
FIG. 1 shows a cross-sectional view of a wheel and nozzle element of the present invention.

The method of coating an aluminum wheel of the present invention provides a streamlined process over that of the prior art while simultaneously enhancing durability of the wheel. Referring now to FIG. 1, a cross-section of an aluminum wheel is generally shown at 10. The wheel 10 is formed via a conventional forming method and includes a machined face 12 of the wheel to form a "bright machined" surface. Additional machine operations to form lug apertures 13 and a valve stem aperture 15 are included, but are not within the scope of this invention. The wheel 10 defines a wheel axis a around which the wheel rotates, as is well known to those of skill in the art. The wheel 10 also includes three-dimensional configuration having recessed surfaces 14 that define sides of the wheel spokes and visible portions of a wheel rim 17. An edge 19 is disposed between the machined face 12 and the recessed surfaces 14.

In one embodiment, nozzle element 21 includes plasma nozzle 23 that is mounted on an articulating arm 25, such as, for example, a robot arm. The plasma nozzle 23 projects a plasma jet 27 in an atmospheric environment as set forth in U.S. Pat. No. 6,677,550, the contents of which are included herein by reference. The nozzle 23 is provided by Plasma-Treat GmbH. However, the other equivalent nozzles 23 capable of providing an atmospheric plasma jet may also be used. In addition, other methods of exposing the wheel 10 to plasma are within the scope of this invention, including, but not limited to sub-atmospheric plasma treatment. A gas line 29 feeds a reactant fluid into the nozzle 23 when desired. It is contemplated by the inventors that siloxane based compounds, such as, for example hexamethyldisiloxane, or other reactant will suffice as will become more evident herein below. In addition, while the use of a plasma nozzle at atmospheric pressure is disclosed, other methods of plasma treatment are within the scope of the invention including, but not limited to vacuum and gas assisted applications.

In the present embodiment, the articulating arm 25 moves the nozzle 23 laterally in a generally parallel direction relative to the wheel axis a and radially inwardly and outwardly relative to the wheel 10. During processing, the wheel 10 rotates around axis a while the nozzle 21 projects the plasma jet 27 toward the wheel 10. While the wheel rotates, the articulating arm moves the nozzle 21 in a radial direction so that the plasma jet 27 contacts the entire face 12 and edge 19 of the wheel. The nozzle 23 continues to project the plasma jet 27 into open spaces 31 between spokes 33 and lug apertures 13 of the wheel 10 so that at least a portion of the recessed surfaces 14 are subject to plasma treatment.

Figure 2:
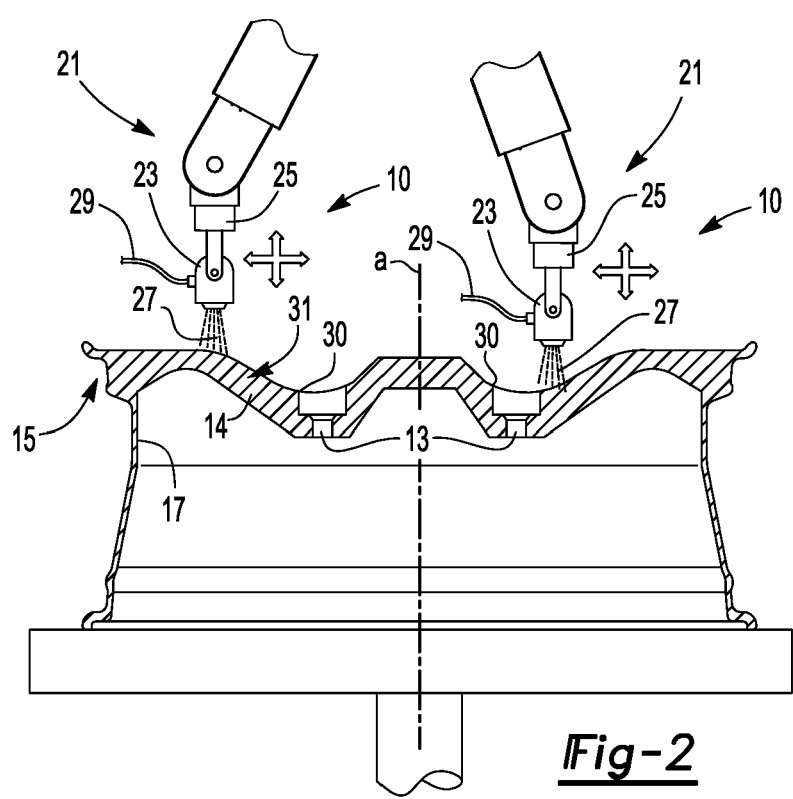
FIG. 2 shows a cross-sectional view of a wheel and an alternative embodiment of the nozzle element of the present invention.

An alternative embodiment is shown in FIG. 2 where two nozzle elements 21 are included. Each nozzle element 21 includes a nozzle 23 mounted on an articulating arm 25. The two nozzle elements 21 are believed to reduce the cycle time for plasma treatment by half. Each nozzle 21 moves in a lateral direction parallel to the axis a and in a radial direction related to the wheel. In one example, the wheel moves only 180° while the nozzles project plasma jet 27 at a desired location. It is further contemplated that the wheel can remain in a stationary position while each articulating arm 25 moves each nozzle 23 around the wheel 10, including projecting plasma directly at the recessed surfaces 14. It is further believed that more than two nozzle elements 21 can be selected to further reduce cycle time.

In the alternative embodiment, multiple nozzles extend radially outwardly from the axis a so that the wheel need only turn one rotation of 360°. to complete the plasma process. A still further embodiment, a plurality of nozzles 29 are configured as an X or a cross shape extending radially outwardly from the axis a so that the wheel need only turn 90°. for full plasma coverage or not at all while the articulating arms 25 move the nozzles 29 around the wheel 10.

Figure 3:
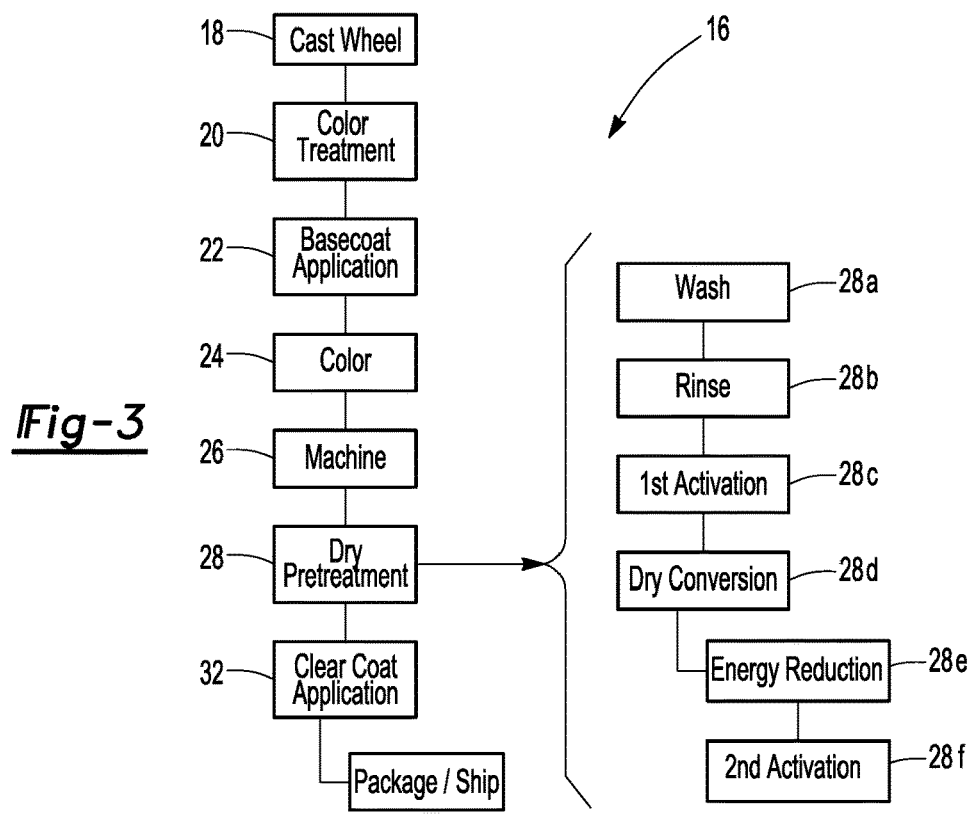
FIG. 3 shows flow chart of one embodiment of the method of the present invention.

Referring now to FIG. 3, a flowchart of a first embodiment is generally shown at 16 where each numbered box represents a different Step of the processing and coating of the wheel 10. The wheel 10 is first formed to a geometrically desirable configuration as identified at Step 18. Subsequent to the forming Step 18, the wheel 10 is subject to conventional cleaning and pretreatment as identified at Step 20 where acidic cleaners, such as, for example, a phosphoric based cleaner, clean the surface of the wheel and a zirconium titanium molecular etch is performed to form a zirconium based conversion coating to prepare the entire surface of the wheel for applying a paint coating. Subsequent to the pretreatment Step 20, a base coat is applied to the entire wheel surface providing a primer surface as identified at Step 22. Subsequent to applying the base coat at Step 22, a color coating is applied to, at least, the three-dimensional surface 14 of the wheel 10 as identified at Step 24. The color coating at Step 24, sometimes referred to as a base coat, includes pigments for color and metallic flakes to add visual depth to the three-dimensional surface 14 to further enhance the esthetics of the wheel 10. Subsequent to the color coating Step 24, the face 12 of the wheel 10 is machined on a lathe to provide a generally planar surface that has a bright machined appearance as identified at Step 26. It should be understood by those of ordinary skill in the art that after each paint application step 20, 24, 32 the paint is cured in a paint bake oven.

After the machining Step 26 is performed on the face 12 of the wheel 10, which is now a bare, smooth machined aluminum, the face 12 subject to a plasma pretreatment as identified at Step 28. The plasma pretreatment Step 28 includes washing 28A and rinsing 28B the wheel 10 to provide a clean surface to the face 12 by removing alloy grinds, dust and die release agents. Subsequent to rinsing, the face 12 of the wheel is subject to a plasma treatment having an atmospheric plasma jet 27 for providing plasma cleaning to the face 12 of the wheel 10. As set forth above, alternative plasma exposure is also within the scope of this invention. This is best represented in FIG. 1 where a plasma nozzle 23 is shown providing a plasma jet 27 onto the bright machined surface comprising the face 12 of the wheel 10. The plasma jet 27 performs the plasma cleaning step 28C during which remaining particulate matter is removed from the alloy surface. The plasma also ionizes the alloy surface causing an increase in the energy state of the alloys surface. In addition, it is believed that alloy oxides, such as, for example, aluminum oxide are formed on the surface after being subject to the plasma cleaning step 28C.

In this embodiment, the wheel 10 is pivoted on an axis a (FIG. 3) while the nozzle 29 moves toward the axis a (FIGS. 1 and 2) of the wheel 10 from proximate the rim 17 toward the axis a for providing a plasma treatment 28C (FIG. 4) to the bright machined face 12 of the wheel 10 and to edges 30 disposed between the three-dimensional surface 14 and the face 12 of the wheel 10. In this embodiment, the plasma jet 27 used in Step 28C includes a spray pattern providing a rapid plasma cleaning to the bright machined face 12 of the wheel 10.

At Step 28D of FIG. 3, a plasma conversion process is performed where a hexamethyldisiloxane or equivalent reactant is injected into the plasma jet 31 providing for an aluminum siloxane molecular structure or other alloy siloxane structure, to form onto the bright machined face 12 of the wheel 10 as will be explained in further detail herein below. In this embodiment, it is contemplated by the inventors that the plasma jet 31 diameter is about 6 mm. However, the plurality embodiments of nozzle 23 configuration for the plasma gStep 28B set forth above may also be used. Furthermore, it is desirable to space the nozzle 23 for both Steps 28C and 28D at an effective distance from the bright machined face 12 of the wheel 10. To the extent the bright machined face 12 of the wheel 10 is not substantially planar, the nozzle 23 moves toward the face 12 of the wheel 10 to maintain the effective distance from the face 12, as set forth above. As further set forth above, the edge 19 is also subject to the plasma jet 27.

Subsequent to the plasma conversion Step 28D, a plasma curing Step 28E is performed to prepare the wheel for a clear coat paint application identified at Step 32. Prior to applying the clear coat, the energy level of the conversion coating is raised at Step 28F by again projecting plasma with the plasma jet 27 toward the surface of the wheel. As set forth above, it is believed that reactivating, or increasing the energy level of the conversion coating improves the adhesion of the clear coat to the conversion coating improving performance. The clear coat is either a powder or liquid depending upon the needs and performance requirements of a particular wheel. After the clear coat has cured, the wheel is ready for packaging and shipping as shown in Step 34.

Figure 4:
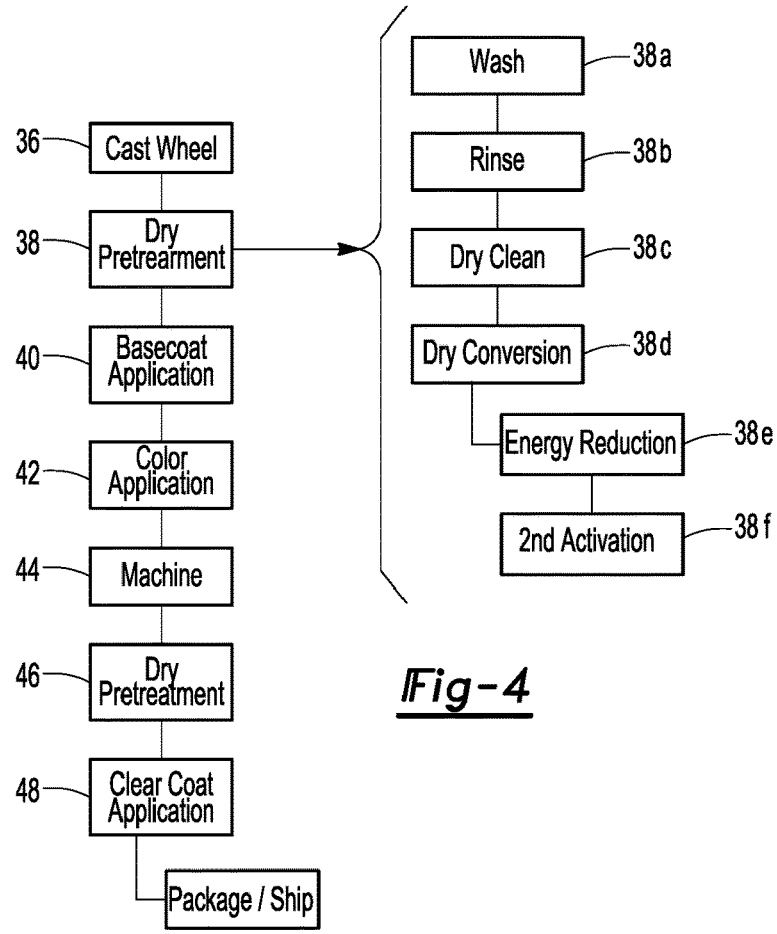
FIG. 4 shows a flow chart of a further embodiment of the method of the present invention.

An alternate embodiment is shown in FIG. 4. In this embodiment the wheel is formed at Step 36 as set forth above. Subsequent to forming, the entire wheel is subject to a color pretreatment identified at Step 38. During the color pretreatment Step 38, the entire wheel is washed and rinsed as identified in Steps 38A and 38B to clean contaminants from casting off the surface of the wheel 10. The entire wheel 10 is treated to an atmospheric plasma cleaning as identified as Step 38C. In this embodiment, the wheel is placed into a vacuum chamber where a plasma gas performs plasma cleaning on the entire surface of the wheel 10. Subsequent to the plasma cleaning Step 38C, a plasma or plasma conversion Step 38D is performed. In this Step 38D, the chamber is again maintained in a vacuum and a siloxane gas, or equivalent reactant, is injected prior to plasma treating the entire wheel. Therefore, the entire wheel includes a siloxane aluminum, or equivalent siloxane alloy, etched surface. Subsequent to the plasma conversion Step 38D, the wheel 10 is subject to a plasma curing Step 38E of the conversion coating to accelerate crosslinking or curing of the conversion coating. Subsequent to the plasma curing step 38E, the conversion coating is again reactivated by performing the second plasma activation step 38F completing the plasma pretreatment Step 38 of the wheel 10. A base coat or primer application follows the plasma pretreatment Step 38 as is identified at Step 40. Subsequent to the base coat application Step 40, a color application Step 42 is performed in a similar manner as set forth above.

The face 12 of the wheel 10 is subject to a machining Step 44 that occurs in a similar manner as set forth above to expose a bright machined face 12. After the machining Step 44, a plasma pretreatment Step 46 occurs, which is similar to the clear pretreatment Step set forth at Step 28 in the embodiment set forth above. Therefore, the bright machined face 12 of the wheel 10 in this embodiment receives an atmospheric plasma cleaning and plasma conversion by way of plasma jet 27 prior to being subject to a clear coat application Step 48 in a similar manner as set forth in step 38. As set forth above, the clear coat application takes the form of a powder clear coat or a liquid clear coat. As further set forth above, after each paint application step 40, 42, 48 the paint is cured in a paint bake oven. Once the clear coat is cured, the wheel is packaged for shipping to the customer.

Figure 5:
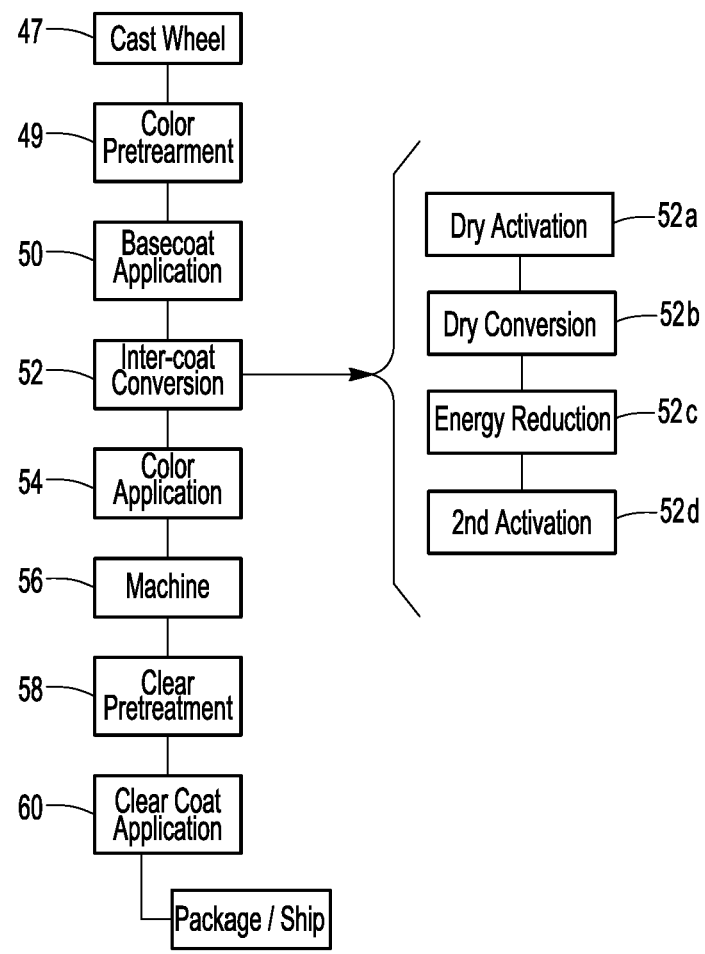
FIG. 5 shows a flow chart of a still further embodiment of the method of the present invention.

A still further embodiment is shown in FIG. 5. In this embodiment, the first Step is a forming Step 47 after which the wheel 10 is subject to a color pretreatment Step 49. The color pretreatment Step 49 is either a conventional color pretreatment where the wheel is subject to a liquid cleaning and a liquid conversion, or a plasma clean and plasma conversion as desired. Subsequent to the color pretreatment Step 49, the wheel is subject to a base coat application Step 50 includes providing a primer, in particular, to the three-dimensional surfaces 14 of the wheel 10. After the base coat application Step 50, an inter-coat conversion Step 52 is performed subjecting the base coat disposed on the wheel 10 to a plasma, plasma cleaning 52A as set forth above, followed by a plasma conversion Step 52A of plasma having a siloxane, such as, for example hexamethyldisoloxane or other equivalent reactant disposed in the plasma jet to alter the surface chemical composition of the base coat applied during the base coat application Step 50 forming a siloxane polymer To accelerate formation of the siloxane polymer, the temperature of the of the wheel is raised in an oven in curing step 52C. Following the curing step 52C, the surface of the wheel is subject to a second activation step 53D increasing the energy level of the surface of the wheel.

Subsequent to the inter-coat conversion Step 52, the wheel receives a color coating, in particular on the three-dimensional surfaces 14 via the color application Step 54. The face 12 of the wheel 10 is next subject to a machining Step 56 to provide a bright machined surface that is next subject to a clear pretreatment Step 58 being either a conventional liquid pretreatment or the plasma cleaning and plasma conversion treatment using the plasma jet 27 set forth above. When a clear pretreatment Step 58 is completed a clear coat application Step 60 provides an aesthetically pleasing finish to the entire wheel 10. As set forth above, after each paint Step 50, 54, 60, the paint is cured in a paint bake oven. Once complete, the wheel 10 is packaged for shipment to the customer.

Figure 6:
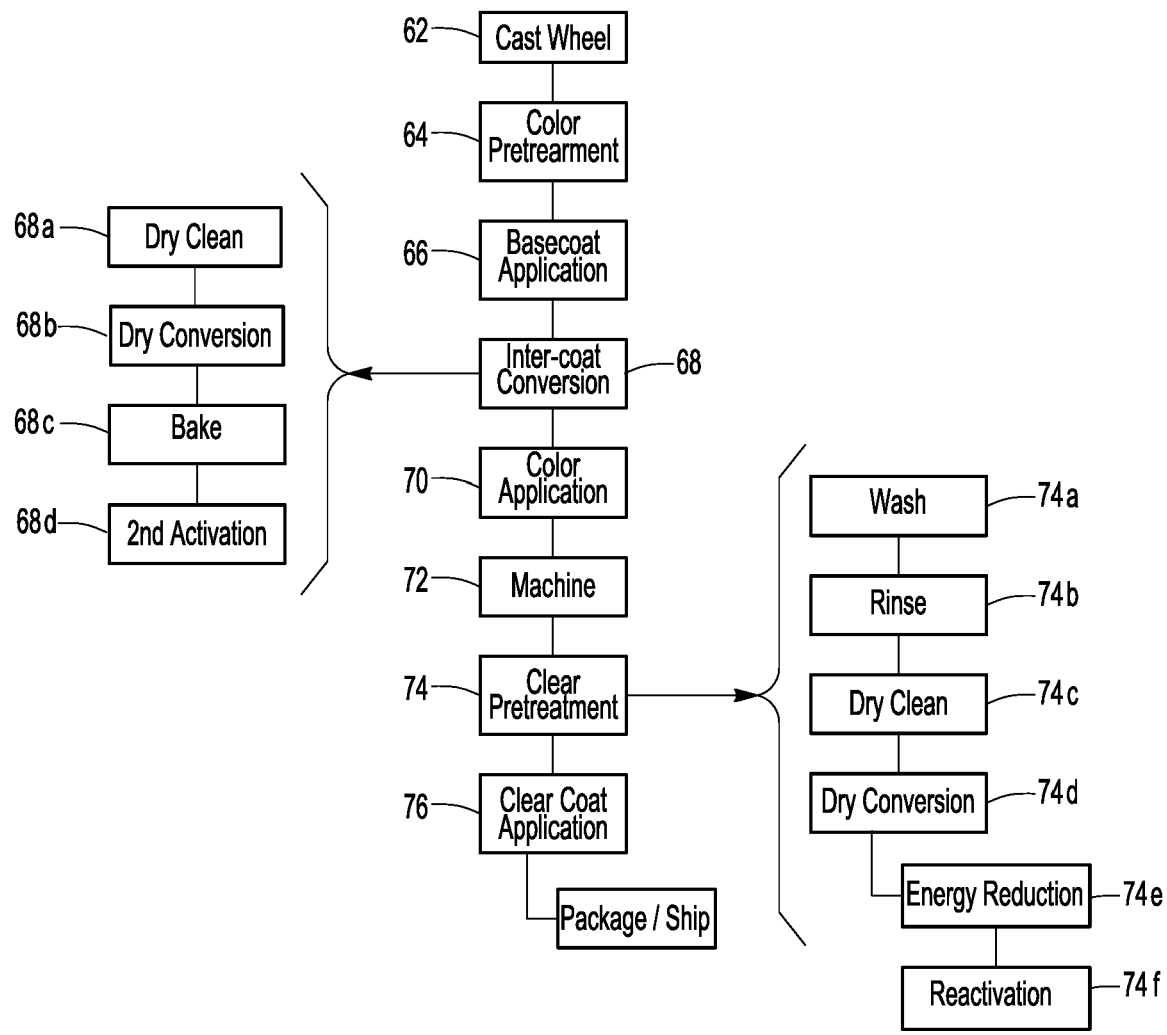
FIG. 6 shows a flow chart of a still further embodiment of the method of the present invention.

Referring now to FIG. 6, the flexibility of the subject invention is shown where alternative and redundant plasma treatment steps may be applied to the wheel 10 making use of the plasma clean and plasma conversion steps of the present invention. In this manner, the wheel is formed Step 62, and is subsequently subject to the color pretreatment Step 64 which makes use of a liquid cleaning and a liquid conversion coating. Next, the base coat application Step 66, a primer is applied to the wheel 10.

Following the base coat application Step 66, the wheel is subject to an inter-coat conversion Step 68 that is performed in the same manner as set forth at the embodiment above making use of plasma cleaning 68A and plasma conversion Step 68B of the primer applied at the base coat application Step 66. Subsequent to the inter-coat conversion Step 68, the wheel 10, in one embodiment, is heated to facilitate curing or crosslinking of the siloxane conversion coating in Step 68C and the then the surface of the wheel is subject to a second plasma activation step 68D to raise the energy level of the conversion coating. Alternative embodiments include infrared light curing, ultraviolet light curing, chemical curing and event plasma curing of the siloxane conversion coating. In addition, the curing includes the formation siloxane molecules, siloxane alloys and siloxane polymers when the siloxane conversion coating is applied over a polymer coating. Next, a color application Step 70 is performed, whereby a color coating is applied, at least to the three-dimensional surfaces 14 of the wheel 10.

Following the color application Step 70, the face 12 of the wheel 10 is machined on a lathe during the machining Step 72 to provide a bright machined surface on the face 12 of the wheel 10. Following the machining Step 72, the clear pretreatment Step 74 occurs where the wheel 10 is first washed at the washing Step 74A and rinsed at the rinsing Step 74B. Following the rinsing Step 74B, the plasma clean Step 74C and the plasma conversion Step 74D making use of ambient plasma jet 27 including siloxane, or equivalent reactant, respectively, as set forth above, occurs. Subsequent to the plasma conversion Step 74D, the wheel is dried and preheated, or otherwise cured (as explained above), in step 74E followed by a reactivation step 74F as set forth above. After reactivation, the clear coat application Step 76 occurs to apply clear coat to the entire wheel. As set forth above, after each paint Step 66, 70, 76, the paint is cured in a paint bake oven. After the clear coat Step 76 has been completed, the wheel 10 is packaged and shipped to the customer.

It should be understood by those of ordinary skill in the art, that each plasma Step not only provides a plasma cleaning, to at least the bright machined surface 12 of the wheel 10, and a plasma conversion using a siloxane or similar reactive compound is also subjects the transition edge 19 to the same pretreatment. In each embodiment, the durability performance of the wheel when subject to chip testing and corrosion testing showed unexpected and enhanced results. Various application methods of the plasma cleaning and plasma conversion Steps contemplated by the inventors include a 2D turning profile where the wheel 10 is pivoted on its axis a along a three-dimensional CNC surface profile whereby the plasma jet 27 follows the profile of the wheel by way of articulating arm 25, and plasma treatment of the entire wheel in a low vacuum environment at both ambient and siloxane enhanced Steps.

It should be understood that the additional step has been established that has provided further improvements and predictability to the plasma spray process. During the plasma clean step 28c, 38c, 74c, alloy oxide, for example, aluminum oxide, forms on the surface 12 of the object being painted, in this case, the wheel 10. At this time, the surface includes an elevated energy from its ground state and the aluminum oxide is unstable.

Subsequent to the plasma clean step 28c, 38c, 74c, a plasma coating is applied during the plasma conversion step 28d, 38d, 74d. The plasma conversion step 28d, 38d, 74d is performed by way of injecting the plasma jet 27 with vaporized hexamethyldisiloxane. Upon entry into the plasma jet, the vaporized hexamethyldisoloxane is broken down to its basic monomers forming excited monomers of silicon dioxide.

Upon impinging impact of the aluminum alloy surface, the silicon dioxide bonds and reacts with the alloy oxide forming a coating have a thin film of silicon alloy. Beneficial performance results when the monomers set forth above crosslink forming new compounds having a higher molecular weight than the monomers. However, elevated surface energy prevents the monomers from crosslinking due to the elevated energy of the atoms. While extended dwell times have resulted in lower surface energy and a desired amount of crosslinking, the requirements of mass production does not allow for extended dwell times. The Plasma/preheat step 28e, 38e, has proven effective in accelerating the crosslinking while also accelerating the reduction in surface energy. Test results have shown that twenty minute dwell time at 350° F. is sufficient. In the case application of intercoat conversion coating 52, 68, the excited siloxane monomers react with the surface of the base coat enhancing adhesion to the clear coat applied over the intercoat conversion coating.

As set forth above, the ground state surface energy prevents good bonding of the clear coat to the conversion coating and results in substantive paint defects. It has been determined an additional plasma treatment after the plasma/preheat step raises the surface energy of the plasma coating without destroying the molecular bonds between the monomers and the alloy oxides substantially improving the clear coat adhesion. The clear coat that has been tested is an epoxy acrylic clear coat provided by Akzo Nobel. Results indicate that a complete elimination of pretreatment in favor of plasma clean, plasma coating, oven baking followed by a second plasma treatment provides the enhanced surface energy enabling superior adhesion of the clear coat both at the substrate and at the base coat or color coat for improved intercoat adhesion.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

What is claimed is:

1. A method of coating an alloy object, comprising the steps of:
    exposing a first plasma onto a surface of the object thereby raising a surface energy of the surface of the object above a ground energy state to a raised energy state;
    exposing a second plasma onto the surface of the object that is at the raised energy state, with wherein said second plasma is infused with a conversion compound for coating the surface of the object with the conversion compound thereby forming a conversion coating with the surface of the object and wherein a surface energy of the conversion coating is at a raised energy state;
    lowering the surface energy of the conversion coating that is disposed upon the surface of the object from the raised energy state toward a ground energy state thereby causing the conversion coating to cure;

exposing a third plasma onto the surface of the conversion coating after lowering the surface energy of the conversion coating that has formed and cured upon the surface of the object thereby raising the surface energy of the cured conversion coating above a ground energy state; and applying a first polymeric coating over the cured conversion coating, that has formed upon the surface of the object, while said conversion coating is disposed at a raised surface energy.

2. The method set forth in claim 1, wherein said step of lowering the surface energy of the conversion coating is further defined by curing the object after the object has been coated with the conversion compound.

3. The method set forth in claim 2, wherein said step of lowering the surface energy of the conversion coating is further defined by curing the object for about twenty minutes at 350° F.

4. The method set forth in claim 1, wherein said step of exposing a second plasma onto the surface of the object that is at the raised energy state with said second plasma being infused with a conversion compound is further defined by infusing the plasma with hexamethyldisiloxane.

5. The method set forth in claim 1, further including a step of coating the surface of the object with a base polymeric coating prior to said step of exposing a first plasma onto the surface of the object followed by raising a surface energy of the base polymeric coating above a ground state surface energy during the step of exposing a first plasma onto the surface of the object.

6. The method set forth in claim 5, further including a step of removing a portion of the base polymeric coating from the surface of the object thereby exposing a portion of the alloy prior to said step of exposing a first plasma onto the surface of the object and subsequently exposing the exposed portion of the alloy to the first plasma thereby raising a surface energy of the exposed portion of the alloy above a ground state surface energy during the step of exposing a first plasma onto the surface of the object.

7. The method set forth in claim 6, wherein said step of exposing a first plasma onto the surface of the object comprises raising the surface energy of both the exposed alloy and the base polymeric coating.

8. The method set forth in claim 5, wherein said step of applying a first polymeric coating over the cured conversion coating that has formed upon the surface of the object, while said conversion coating is disposed at a raised surface energy is further defined by applying the first polymeric coating over at least one of the alloy and the base polymeric coating.

9. The method set forth in claim 8, wherein said step of applying a first polymeric coating over a primary the cured conversion coating further includes applying a second clear polymeric coating over the first polymeric coating.

10. The method set forth in claim 8, wherein said step of applying a first polymeric coating over the cured conversion coating is further defined as applying a first clear polymeric coating over a color polymeric coating.

11. The method set forth in claim 1, wherein said steps of exposing said first plasma, and said second plasma, and said third plasma are further defined by exposing said first plasma, and said second plasma, and said third plasma with at least one plasma nozzle at atmospheric pressure.

12. The method set forth in claim 1, wherein said steps of exposing said first plasma, said second plasma, and said third plasma are further defined by exposing said first plasma, said second plasma, and said third plasma with at least one plasma nozzle below atmospheric pressure.

* * * * *